US011008914B2

(12) United States Patent
Yamamoto et al.

(10) Patent No.: US 11,008,914 B2
(45) Date of Patent: May 18, 2021

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Ryohei Yamamoto, Nishio (JP); Toshihiro Mori, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 268 days.

(21) Appl. No.: 15/809,203

(22) Filed: Nov. 10, 2017

(65) Prior Publication Data

US 2018/0179937 A1 Jun. 28, 2018

(30) Foreign Application Priority Data

Dec. 27, 2016 (JP) .............................. JP2016-253584

(51) Int. Cl.
*F01N 3/20* (2006.01)
*F01N 3/035* (2006.01)
(Continued)

(52) U.S. Cl.
CPC ........... *F01N 3/2033* (2013.01); *F01N 3/021* (2013.01); *F01N 3/0253* (2013.01); *F01N 3/035* (2013.01); *F01N 3/0814* (2013.01); *F01N 3/0842* (2013.01); *F01N 3/103* (2013.01); *F01N 3/36* (2013.01); *F01N 9/002* (2013.01);
(Continued)

(58) Field of Classification Search
CPC .. F01N 11/002; F01N 13/009; F01N 2250/02; F01N 2260/04; F01N 2550/02; F01N 2560/06; F01N 2610/03; F01N 3/021; F01N 3/0253; F01N 3/035; F01N 3/0814; F01N 3/0842; F01N 3/103; F01N 3/2033; F01N 3/36; F01N 9/002
See application file for complete search history.

(56) References Cited

U.S. PATENT DOCUMENTS 7,762,061 B2 * 7/2010 Birkby ................. F01N 3/2066
60/286
2002/0112472 A1 8/2002 Tashiro et al.
(Continued)

FOREIGN PATENT DOCUMENTS

EP  1 388 647 A2  11/2004
JP  11-210442  8/1999
(Continued)

*Primary Examiner* — Anthony Ayala Delgado
(74) *Attorney, Agent, or Firm* — Finnegan, Henderson, Farabow, Garrett & Dunner, LLP

(57) ABSTRACT

An exhaust purification system of an internal combustion engine 1 comprises: a filter 29 arranged in an exhaust passage of the internal combustion engine and trapping particulate matter contained in exhaust gas, a catalyst 28 arranged in the exhaust passage at an upstream side from the filter in a direction of exhaust flow or supported on the filter, a fuel feed device 3, 35 feeding fuel to the catalyst, and a control device 80 configured to control the feed of fuel by the fuel feed device. The control device is configured to feed fuel from the fuel feed device to the catalyst so as to burn off particulate matter trapped at the filter as processing for filter regeneration, and feed liquid state fuel from the fuel feed device to the catalyst after the processing for filter regeneration.

12 Claims, 9 Drawing Sheets

(51) Int. Cl.

|  |  |
|---|---|
| *F01N 3/025* | (2006.01) |
| *F01N 9/00* | (2006.01) |
| *F01N 3/10* | (2006.01) |
| *F01N 3/08* | (2006.01) |
| *F01N 3/36* | (2006.01) |
| *F01N 3/021* | (2006.01) |
| *F01N 11/00* | (2006.01) |
| *F01N 13/00* | (2010.01) |

(52) U.S. Cl.
CPC .......... *F01N 11/002* (2013.01); *F01N 13/009* (2014.06); *F01N 2250/02* (2013.01); *F01N 2260/04* (2013.01); *F01N 2550/02* (2013.01); *F01N 2560/06* (2013.01); *F01N 2610/03* (2013.01); *Y02T 10/40* (2013.01)

(56) References Cited

U.S. PATENT DOCUMENTS

| | | |
|---|---|---|
| 2007/0209333 A1 | 9/2007 | Kondou |
| 2010/0170227 A1* | 7/2010 | Tsukada .................. E02F 9/00 60/286 |
| 2015/0192050 A1* | 7/2015 | Meier ..................... F01N 3/206 60/274 |
| 2015/0204224 A1 | 7/2015 | Daido et al. |
| 2018/0179937 A1 | 6/2018 | Yamamoto et al. |

FOREIGN PATENT DOCUMENTS

| | | |
|---|---|---|
| JP | 2013-124576 | 6/2013 |
| JP | 2014-051896 A | 3/2014 |

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the past has been an internal combustion engine provided in an exhaust passage with a filter for trapping particulate matter (PM) contained in exhaust gas so as to purify exhaust gas discharged from the combustion chambers. In such an internal combustion engine, fuel is made to oxidatively react in a catalyst provided at an upstream side of the filter, and the heat of reaction caused by the oxidation reaction is used to burn off the PM deposited on the filter as "processing for filter regeneration".

However, processing for filter regeneration can be performed when the internal combustion engine is in a predetermined operating state. For this reason, in the internal combustion engine described in PLT 1, in order to prevent the filter from being clogged by the PM while processing for filter regeneration cannot be performed, a liquid substance such as condensation water is fed to the PM on the filter.

CITATION LIST

Patent Literature

PLT 1: Japanese Patent Publication No. 2013-124576A
PLT 2: Japanese Patent Publication No. 11-210442A

SUMMARY OF INVENTION

Technical Problem

However, PLT 1 does not allude at all to processing for filter regeneration causing PM to deposit on the catalyst. The inventors of the present application discovered as a result of intensive research that PM deposits even on catalysts where an oxidation reaction is performed for raising the temperature of the filter. This phenomenon is believed to be based on a mechanism such as explained below.

In processing for filter regeneration, fuel is fed to the catalyst to cause an oxidation reaction on the catalyst. However, at the upstream side end face of the catalyst, an oxidation reaction does not easily occur, and therefore the rise in temperature due to the heat of an oxidation reaction is small. Therefore, the heavy fractions of the fuel remain on the upstream side end face of the catalyst. The residual heavy fractions of the fuel oxidatively polymerize due to being exposed to the exhaust gas and change to high viscosity components. As a result, PM deposits on the upstream side end face of the catalyst through the fuel. If the processing for filter regeneration is repeated and the amount of deposition of PM on the catalyst increases, the PM will cause the catalyst to become clogged and the catalyst will decline in function.

Therefore, an object of the present invention is to provide an exhaust purification system of an internal combustion engine able to suppress clogging of a catalyst by PM.

Solution to Problem

The summary of the present disclosure is as follows.

(1) An exhaust purification system of an internal combustion engine comprising: a filter arranged in an exhaust passage of the internal combustion engine and trapping particulate matter contained in exhaust gas, a catalyst arranged in the exhaust passage at an upstream side from the filter in a direction of exhaust flow or supported on the filter, a fuel feed device feeding fuel to the catalyst, and a control device configured to control the feed of fuel by the fuel feed device, wherein the control device is configured to feed fuel from the fuel feed device to the catalyst so as to burn off particulate matter trapped at the filter as processing for filter regeneration, and feed liquid state fuel from the fuel feed device to the catalyst after the processing for filter regeneration.

(2) The exhaust purification system of an internal combustion engine described in above (1), wherein the control device is configured to detect or estimate a temperature of an inflowing exhaust gas flowing into the catalyst, and feed fuel from the fuel feed device to the catalyst when the detected or estimated temperature of the inflowing exhaust gas is a minimum boiling point of the fuel or less after the processing for filter regeneration.

(3) The exhaust purification system of an internal combustion engine described in above (1) or (2), wherein the fuel feed device is arranged in the exhaust passage at an upstream side from the catalyst in a direction of exhaust flow, and the control device is configured to feed fuel from the fuel feed device to the catalyst when the internal combustion engine is in an idling stop state after the processing for filter regeneration.

(4) The exhaust purification system of an internal combustion engine described in any one of above (1) to (3), wherein the control device is configured to detect or estimate a temperature of an inflowing exhaust gas flowing into the catalyst, and feed liquid state fuel from the fuel feed device to the catalyst if a total of the time when the temperature of the inflowing exhaust gas detected or estimated after the end of the processing for filter regeneration is a reference temperature or more reaches a threshold value or more, the reference temperature being a temperature of an activation temperature of the catalyst or more.

(5) The exhaust purification system of an internal combustion engine described in any one of above (1) to (3), wherein the control device is configured to detect or estimate a temperature of an inflowing exhaust gas flowing into the catalyst, and feed liquid state fuel from the fuel feed device to the catalyst if a total of the time when the temperature of the inflowing exhaust gas detected or estimated after the end of the processing for filter regeneration is a reference temperature to less than a combustion temperature of the particulate matter reaches a threshold value or more, the reference temperature being a temperature of an activation temperature of the catalyst or more.

(6) The exhaust purification system of an internal combustion engine described in above (4) or (5), wherein the reference temperature is the activation temperature of the catalyst.

(7) The exhaust purification system of an internal combustion engine described in above (4) or (5), wherein the reference temperature is a temperature of the inflowing exhaust gas detected or estimated during the processing for filter regeneration.

Advantageous Effects of Invention

According to the present invention, there is provided an exhaust purification system of an internal combustion engine able to suppress clogging of a catalyst by PM.

DESCRIPTION OF EMBODIMENTS

Figure 1:
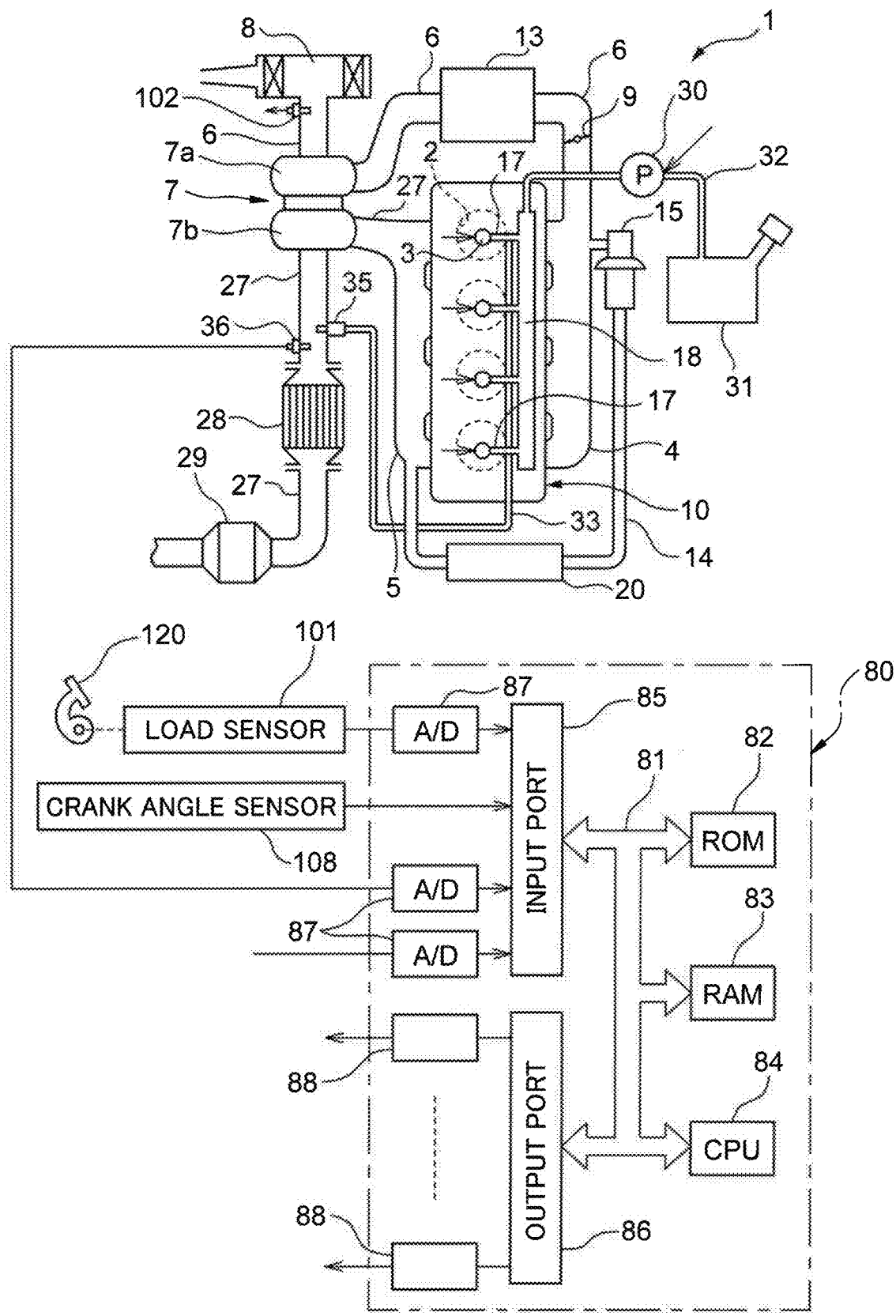
FIG. 1 is a view schematically showing an internal combustion engine in which an exhaust purification system of an internal combustion engine according to a first embodiment of the present invention is provided.

Below, referring to the drawings, embodiments of the present invention will be explained in detail. Note that, in the following explanation, similar component elements will be assigned the same reference numerals.

First Embodiment

Below, referring to FIG. 1 to FIG. 7, a first embodiment of the present invention will be explained.

<Explanation of Internal Combustion Engine as a Whole>
FIG. 1 is a view schematically showing an internal combustion engine in which an exhaust purification system of an internal combustion engine according to the first embodiment of the present invention is provided. The internal combustion engine 1 shown in FIG. 1 is a compression ignition type internal combustion engine (diesel engine). The internal combustion engine 1 is mounted in a vehicle.

Referring to FIG. 1, 10 indicates an engine body, 2 a combustion chamber of a cylinder, 3 an electronic control type cylinder fuel injector injecting fuel into the combustion chamber 2, 4 an intake manifold, and 5 an exhaust manifold.

The intake manifold 4 is connected through an intake pipe 6 to an outlet of a compressor 7a of a turbocharger (supercharger) 7. An inlet of the compressor 7a is connected through the intake pipe 6 to an air cleaner 8. Inside the intake pipe 6, a throttle valve 9 is arranged. Further, around the intake pipe 6, an intercooler 13 is arranged so as to cool intake air flowing through the inside of the intake pipe 6. In the internal combustion engine 1, the engine cooling water is guided to the inside of the intercooler 13 where the engine cooling water is used to cool the intake air. The intake manifold 4 and intake pipe 6 form an intake passage for guiding air to the combustion chambers 2.

On the other hand, the exhaust manifold 5 is connected through an exhaust pipe 27 to an inlet of a turbine 7b of the turbocharger 7. The outlet of the turbine 7b is connected through the exhaust pipe 27 to a catalyst 28. The catalyst 28 is connected through the exhaust pipe 27 to a filter 29. The exhaust manifold 5 and exhaust pipe 27 form an exhaust passage for discharging exhaust gas produced by combustion of an air-fuel mixture in the combustion chambers 2.

The catalyst 28 is an oxidation catalyst (DOC) able to oxidize unburned fuel (HC, CO, etc.) in the exhaust gas. The catalyst 28 is arranged in the exhaust passage at the upstream side from the filter 29 in the direction of exhaust flow. Specifically, the catalyst 28 is arranged in the exhaust passage of the internal combustion engine 1 between the turbine 7b and the filter 29 in the exhaust pipe 27. The filter 29 traps the particulate matter (PM) contained in the exhaust gas. The filter 29 is for example a diesel particulate filter (DPF).

The exhaust manifold 5 and the intake manifold 4 are connected with each other through an exhaust gas recirculation (EGR) passage 14. Inside the EGR passage 14, an electronically controlled EGR control valve 15 is arranged. Further, around the EGR passage 14, an EGR cooling device 20 for cooling the EGR gas flowing through the inside of the EGR passage 14 is arranged. In the internal combustion engine 1, engine cooling water is guided into the EGR cooling device 20 where the engine cooling water is used to cool the EGR gas.

The fuel is fed by a fuel pump 30 from a fuel tank 31 through a fuel feed pipe 32 to the inside of a common rail 18. The fuel pump 30 pumps up the fuel inside the fuel tank 31 and raises the pressure of the fuel. The high pressure fuel fed into the common rail 18 is fed through the fuel feed lines 17 to the cylinder fuel injectors 3. Each cylinder fuel injector 3 injects fuel into the combustion chamber 2. The fuel is for example diesel fuel.

Further, each cylinder fuel injector 3 is connected to a leak fuel pipe 33. Among the fuel fed from the common rail 18 to the individual cylinder fuel injectors 3, the fuel not injected into the combustion chambers 2 is supplied through the leak fuel pipe 33 to the exhaust fuel injector 35.

Figure 2:
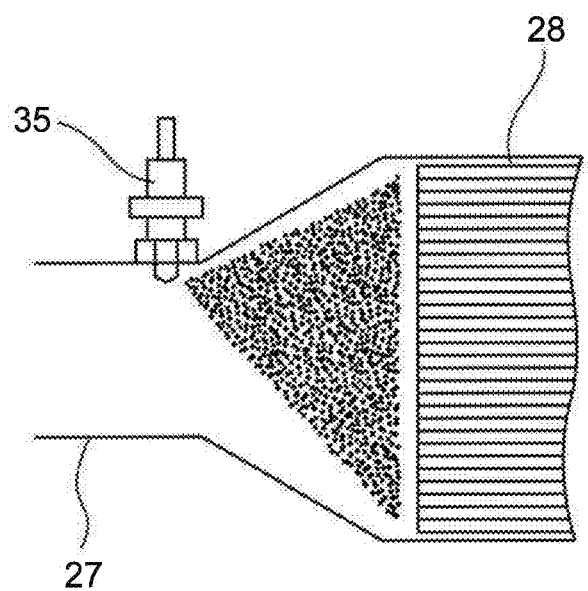
FIG. 2 is a view showing one example of a mode of injection of fuel by an exhaust fuel injector.

The exhaust fuel injector 35 is arranged in the exhaust passage at the upstream side of the catalyst 28 in the direction of exhaust flow. Specifically, the exhaust fuel injector 35 is fastened to the exhaust pipe 27 between the turbine 7b and catalyst 28 in the exhaust passage of the internal combustion engine 1. The exhaust fuel injector 35 is, for example, an electronically controlled injector similar to the cylinder fuel injectors 3. The exhaust fuel injector 35 injects fuel into the exhaust pipe 27 and feeds the fuel through the exhaust pipe 27 to the catalyst 28. For example, the exhaust fuel injector 35, as shown in FIG. 2, injects fuel toward the catalyst 28.

The various control operations of the internal combustion engine 1 are performed by an electronic control unit (ECU)

80. The ECU 80 is comprised of a digital computer provided with components connected with each other through bidirectional buses 81, such as a ROM (read only memory) 82, RAM (random access memory) 83, CPU (microprocessor) 84, input port 85, and output port 86. Outputs of a load sensor 101 and air flow meter 102 are input through corresponding AD converters 87 to the input port 85.

The load sensor 101 generates an output voltage proportional to the amount of depression of the accelerator pedal 120. Therefore, the load sensor 101 detects the engine load. The air flow meter 102 is arranged in the intake passage between the air cleaner 8 and the compressor 7a and detects the rate of flow of air flowing through the inside of the intake pipe 6. Further, the input port 85 is connected to a crank angle sensor 108 generating an output pulse every time a crankshaft rotates by for example 15°. The crank angle sensor 108 detects the engine speed.

On the other hand, the output port 86 is connected through corresponding drive circuits 88 to the cylinder fuel injectors 3, motor for driving throttle valve, EGR control valve 15, fuel pump 30, and exhaust fuel injector 35. The ECU 80 controls an injection timing and injection time of fuel injected from a cylinder fuel injector 3, an opening degree of the throttle valve 9, an opening degree of the EGR control valve 15, an operation of the fuel pump 30, and an injection timing and injection time of fuel injected from the exhaust fuel injector 35.

Note that, the internal combustion engine in which the exhaust purification system is provided may be a spark ignition type internal combustion engine (gasoline engine) in which spark plugs are arranged at the combustion chambers. Further, the specific configuration of the internal combustion engine such as the cylinder array, configuration of the intake and exhaust systems, and presence of any supercharger may differ from the configuration shown in FIG. 1.

For example, the fuel fed to the cylinder fuel injector 3 may be fed to the common rail 18 by an in-tank pump arranged inside the fuel tank 31 instead of by the fuel pump 30. Further, the fuel fed to the exhaust fuel injector 35 may be fed through a fuel pipe (not shown) directly connecting the fuel tank 31 to the exhaust fuel injector 35 without going through the fuel pipe 32 and leak fuel pipe 33. In this case, the leak fuel pipe 33 is omitted. Further, the fuel fed to the exhaust fuel injector 35 may be stored in a separate fuel tank from the fuel tank 31. The fuel is for example diesel fuel.

<Configuration of Exhaust Purification System of Internal Combustion Engine>

Below, the configuration of an exhaust purification system of the internal combustion engine 1 according to the first embodiment of the present invention will be explained. The exhaust purification system of the internal combustion engine 1 is provided with a filter 29, catalyst 28, fuel feed device feeding fuel to the catalyst 28, and control device controlling the feed of fuel by the fuel feed device. In the present embodiment, the exhaust fuel injector 35 corresponds to the fuel feed device, and the ECU 80 corresponds to the control device.

Note that, the fuel feed device may be the cylinder fuel injector 3 injecting fuel into the combustion chamber 2. The cylinder fuel injector 3 can feed unburned fuel to the catalyst 28 by injecting fuel in the expansion stroke at each cylinder as "post injection". In this case, the exhaust fuel injector 35 may be omitted.

<Filter Regeneration Control>

In an exhaust purification system of the internal combustion engine 1, the PM in the exhaust gas is trapped by the filter 29 whereby the exhaust gas is purified. However, if the amount of the PM trapped at the filter 29 increases, the filter 29 will clog, and thus discharge of exhaust gas through the filter 29 will be obstructed. For this reason, the PM trapped by the filter 29 has to be periodically removed.

In the present embodiment, to remove the PM trapped by the filter 29, the control device of the exhaust purification system performs processing for filter regeneration. In the processing for filter regeneration, fuel is fed from the fuel feed device to the catalyst 28 to burn off the PM trapped by the filter 29. When fuel is fed to the catalyst 28, an oxidation reaction of fuel occurs on the catalyst 28, and the temperature of the exhaust gas flowing into the filter 29 rises due to the heat of reaction. As a result, the temperature of the filter 29 rises and the PM trapped by the filter 29 is burned off.

However, if processing for filter regeneration is performed, the PM trapped by the filter 29 will be removed, but PM will deposit on the catalyst 28. This phenomenon is considered to be based on the mechanism such as explained below.

As explained above, in processing for filter regeneration, fuel is fed to the catalyst 28 to cause an oxidation reaction on the catalyst 28. However, at the upstream side (engine body 10 side) end face of the catalyst 28, an oxidation reaction does not easily occur, and therefore the rise in temperature due to the heat of an oxidation reaction is small. Therefore, the heavy fractions of the fuel remain on the upstream side end face of the catalyst 28. The residual heavy fractions of the fuel oxidatively polymerize due to being exposed to the exhaust gas and change to high viscosity components. As a result, PM deposits on the upstream side end face of the catalyst 28 through the fuel. If the processing for filter regeneration is repeated and the amount of deposition of PM on the catalyst 28 increases, the PM will cause the catalyst 28 to become clogged and the catalyst 28 will decline in function.

<Removal of PM on Catalyst>

For this reason, in the present embodiment, the control device of the exhaust purification system feeds liquid state fuel from the fuel feed device to the catalyst 28 after the processing for filter regeneration to remove PM deposited on the catalyst 28. Below, the mechanism by which PM deposited on the catalyst 28 is removed by feeding liquid state fuel to the catalyst 28 will be explained.

Figure 3A:
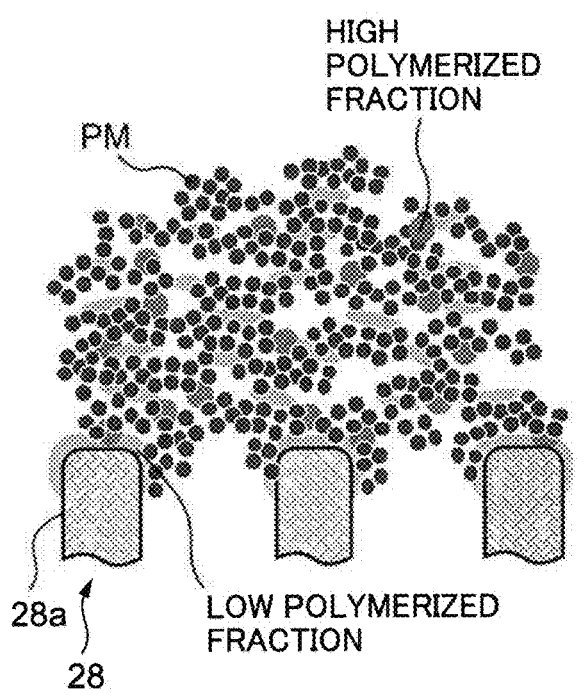
FIG. 3A is a view for explaining a mechanism by which PM is removed from a catalyst by feeding liquid state fuel.
Figure 3B:
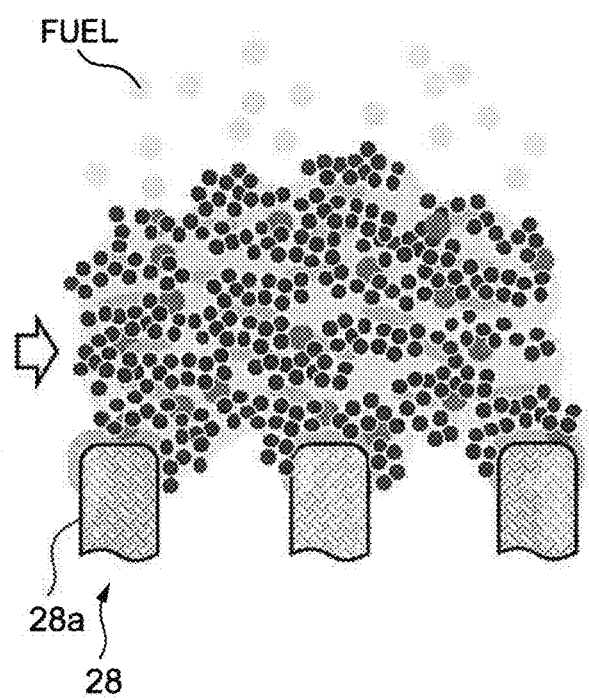
FIG. 3B is a view for explaining a mechanism by which PM is removed from a catalyst by feeding liquid state fuel.
Figure 3C:
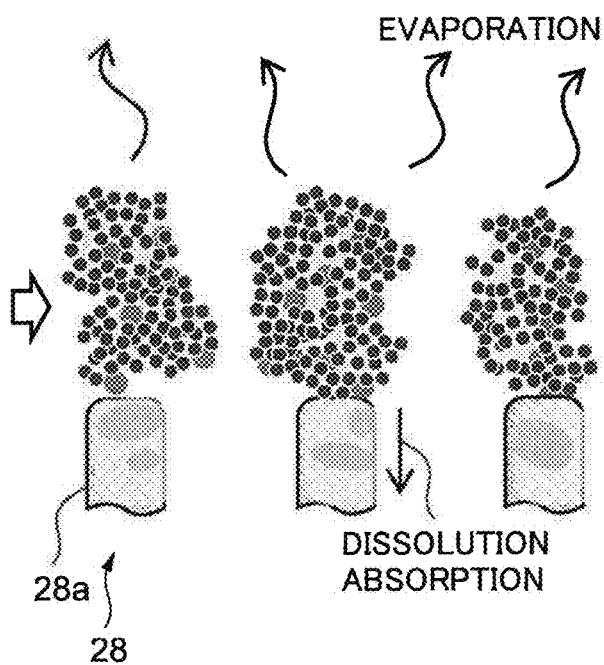
FIG. 3C is a view for explaining a mechanism by which PM is removed from a catalyst by feeding liquid state fuel.
Figure 3D:
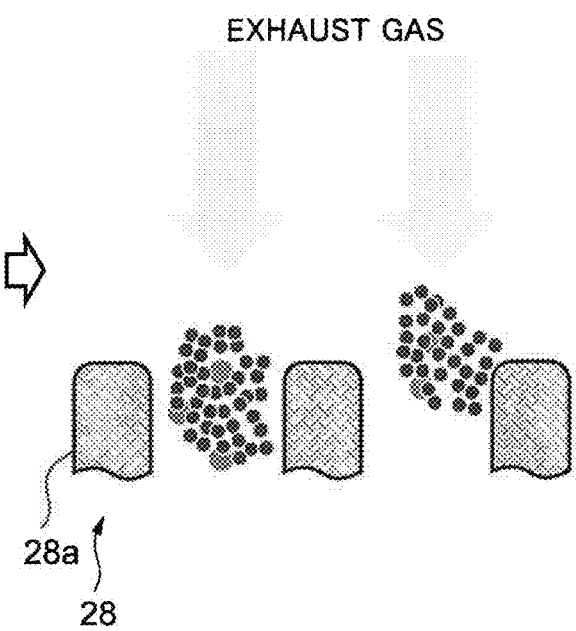
FIG. 3D is a view for explaining a mechanism by which PM is removed from a catalyst by feeding liquid state fuel.

FIGS. 3A to 3D are views for explaining the mechanism by which PM is removed from the catalyst 28 due to the feed of liquid state fuel. As shown in FIG. 3A, the heavy fractions of the fuel fed to the catalyst 28 during processing for filter regeneration change to a high viscosity high polymerized fraction and low polymerized fraction due to oxidative polymerization, and cause the PM in the exhaust gas to deposit on a base 28a of the catalyst 28. After that, as shown in FIG. 3B, the liquid state fuel is fed to the catalyst 28. If liquid state fuel is fed to the catalyst 28, the soluble organic fraction (SOF) in the PM dissolves in the fuel. As shown in FIG. 3C, the fuel in which the SOF is dissolved is absorbed at the base 28a of the catalyst 28 and evaporates due to the heat. Further, when the fuel in which the SOF is dissolved is absorbed in the base 28a of the catalyst 28, the liquid cross-linking force causes the PM to aggregate. The aggregated PM falls in adhesion with the base 28a. For this reason, after that, as shown in FIG. 3D, the aggregated PM is peeled off from the base 28a by the exhaust gas. Therefore, by feeding liquid state fuel, it is possible to remove PM from the catalyst 28.

The inventors of the present application performed the following experiments to confirm the effect of removal of PM by the feed of fuel. They fed fuel to the catalyst to regenerate the filter, then exposed the catalyst to 370° C. exhaust gas for 2 hours. As a result, the clogging rate of the catalyst became 60% or more. After that, they fed liquid state fuel (diesel fuel) in an amount of 0.06 ml/cm$^2$ per unit area of the catalyst to the catalyst. As a result, the clogging rate of the catalyst became 20% or less. Therefore, it was confirmed that by feeding liquid state fuel to a catalyst, clogging of the catalyst due to PM can be suppressed.

Figure 4:
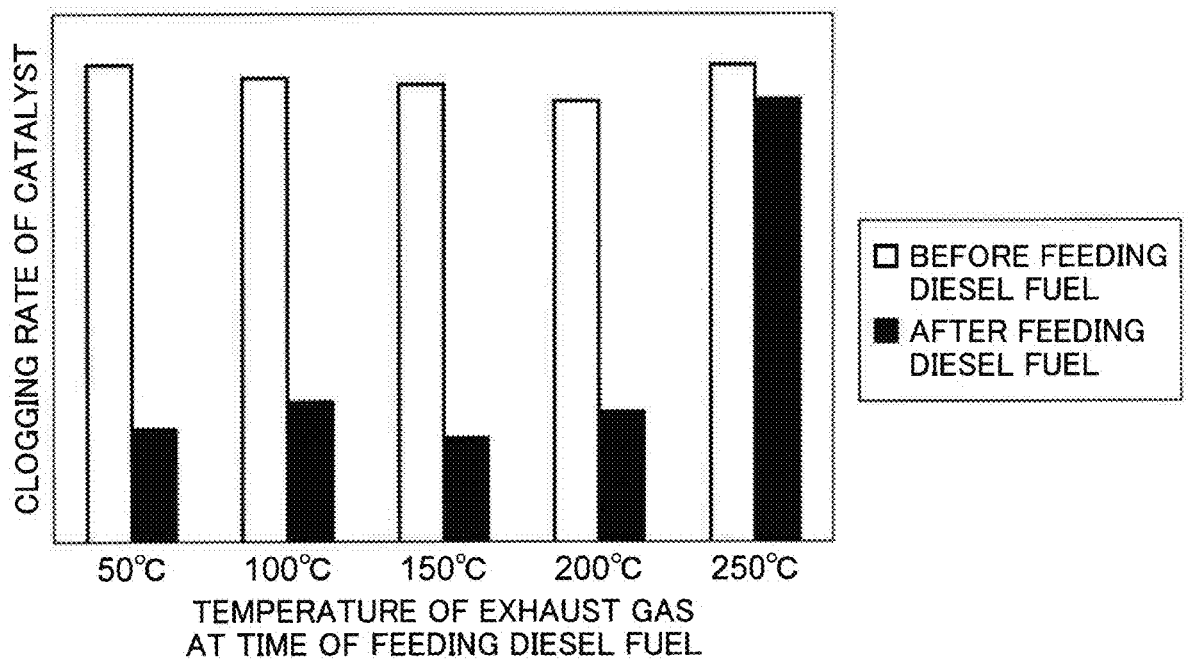
FIG. 4 is a graph showing a relationship between a temperature of exhaust gas at the time of feeding diesel fuel and a clogging rate of a catalyst.

FIG. 4 is a graph showing a relationship between a temperature of exhaust gas at the time of feeding diesel fuel and a clogging rate of a catalyst. Note that, the temperature of the exhaust gas was measured at the upstream side of the catalyst in the direction of exhaust flow. In this experiment, fuel was fed to the catalyst to regenerate the filter, then the catalyst was exposed to 370° C. exhaust gas for 2 hours and the clogging rate of the catalyst was measured. Further, after that, diesel fuel in an amount of 0.06 ml/cm$^2$ per unit area of the catalyst was fed to the catalyst, and the clogging rate of the catalyst was measured. In five experiments, the temperature of the exhaust gas at the time of feed of diesel fuel was changed. The boiling point of diesel fuel differs for each of the ingredients contained in the diesel fuel, but in general is 200° C. to 350° C. As shown in the graph of FIG. 4, at a temperature of the minimum boiling point (200° C.) of the diesel fuel or less, the diesel fuel is fed to the catalyst in a liquid state, so the clogging rate of the catalyst greatly fell due to the feed of diesel fuel. On the other hand, at a temperature higher than the minimum boiling point of diesel fuel (250° C.), the diesel fuel is fed to the catalyst in the state of a gas-liquid mixture, so the clogging rate of the catalyst did not fall much at all due to the feed of diesel fuel.

The control device of the exhaust purification system performs the following control to feed liquid state fuel to the catalyst 28. The control device, for example, performs the processing for filter regeneration, then feeds fuel from the fuel feed device to the catalyst 28 when the temperature of the exhaust gas flowing into the catalyst 28 (below, referred to as the "inflowing exhaust gas") is the minimum boiling point of the fuel or less.

The temperature of the inflowing exhaust gas is detected or estimated by the control device. The control device, for example, uses an exhaust temperature sensor 36 arranged in the exhaust passage to detect the temperature of the inflowing exhaust gas. The exhaust temperature sensor 36 is arranged in the exhaust passage at the upstream side of the catalyst 28 in the direction of exhaust flow, specifically, is arranged in the exhaust pipe 27 between the exhaust fuel injector 35 and the catalyst 28. Further, the output of the exhaust temperature sensor 36 is input through the corresponding AD converter 87 to the input port 85.

Figure 5:
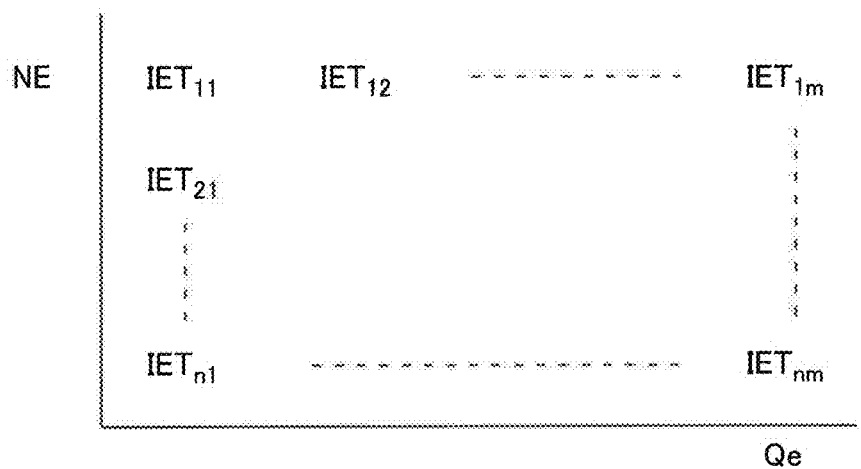
FIG. 5 is a map showing a relationship between an amount of fuel injection from a cylinder fuel injector and engine speed, and a temperature of inflowing exhaust gas.

Note that, control device may use a map or calculation formula to estimate the temperature of the inflowing exhaust gas based on the amount of fuel injection from the cylinder fuel injector 3 and the engine speed. In this case, the exhaust temperature sensor 36 may be omitted from the internal combustion engine 1. The map or calculation formula is for example stored in the ROM 82 of the ECU 80. In the map, as shown in FIG. 5, the temperature of the inflowing exhaust gas IET is shown as a function of the amount of fuel injection Qe from the cylinder fuel injector 3 and the engine speed NE.

Further, the control device may feed fuel from the fuel feed device to the catalyst 28 when the internal combustion engine 1 is in the idling stop state after the processing for filter regeneration. In this case, as the fuel feed device, the exhaust fuel injector 35 is used. Note that, the "idling stop state" means the state where when the vehicle in which the internal combustion engine 1 is mounted is temporarily stopped, the feed of fuel to the combustion chamber 2 is stopped. In the idling stop state, high temperature exhaust gas produced by burning the air-fuel mixture is not discharged from the combustion chamber 2, so the fuel injected from the exhaust fuel injector 35 is fed in a liquid state to the catalyst 28.

<Processing for PM Removal>

Figure 6:
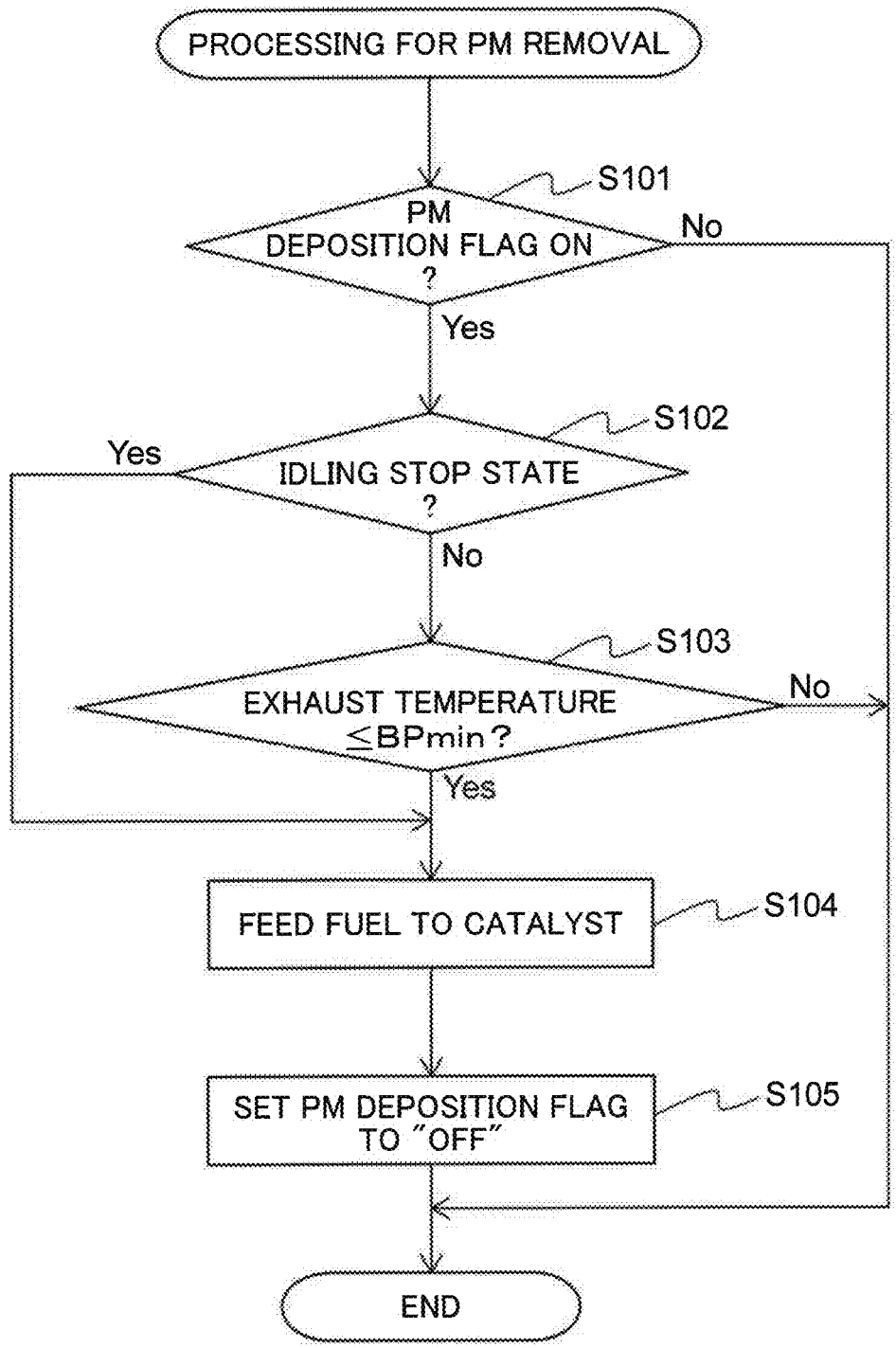
FIG. 6 is a flow chart showing a control routine for processing for PM removal in a first embodiment of the present invention.

Below, referring to the flow chart of FIG. 6, the control for removing the PM deposited at the catalyst 28 will be explained in detail. FIG. 6 is a flow chart showing a control routine of processing for PM removal in the first embodiment of the present invention. The present control routine is repeatedly performed by the control device of the exhaust purification system (in the present embodiment, the ECU 80).

First, at step S101, the control device judges whether the PM deposition flag is set to "on". The PM deposition flag is a flag which is set to "on" if it is estimated that a predetermined amount or more of PM has deposited at the catalyst 28. The PM deposition flag is set to "on" in the later explained control routine for processing for filter regeneration. If at step S101 it is judged that the PM deposition flag is set to "off", the present control routine is ended. On the other hand, if it is judged that the PM deposition flag is set to "on", the present control routine proceeds to step S102.

At step S102, the control device judges whether the internal combustion engine 1 is in an idling stop state. If at step S102 it is judged that the internal combustion engine 1 is not in an idling stop state, the present control routine proceeds to step S103. At step S103, the control device detects or estimates the temperature of the inflowing exhaust gas (exhaust temperature), and judges whether the temperature of the inflowing exhaust gas is the minimum boiling point BPmin of the fuel or less. The fuel is for example diesel fuel, and the minimum boiling point BPmin of the fuel is for example 200° C.

If at step S103 it is judged that the temperature of the inflowing exhaust gas is higher than the minimum boiling point BPmin of the fuel, liquid state fuel cannot be fed to the catalyst 28, so the present control routine is ended. On the other hand, if it is judged that the temperature of the inflowing exhaust gas is the minimum boiling point BPmin of the fuel or less, the present control routine proceeds to step S104. Further, if at step S102 it is judged that the internal combustion engine 1 is in the idling stop state, the temperature of the inflowing exhaust gas may conceivably be the minimum boiling point BPmin of the fuel or less, so the present control routine skips step S103 and proceeds to step S104.

At step S104, the control device feeds fuel from the fuel feed device to the catalyst 28. At this time, liquid state fuel is fed to the catalyst 28. The feed amount of the fuel is set to, for example, 0.06 ml/cm$^2$ per unit area of the catalyst 28 or less. By doing this, it is possible to suppress deterioration of the fuel efficiency of the internal combustion engine 1 while removing PM from the catalyst 28.

Next, at step S105, the control device sets the PM deposition flag to "off". After step S105, the present control routine is ended. Note that, either of step S102 and step S103 may be omitted.

<Processing for Filter Regeneration>

Figure 7:
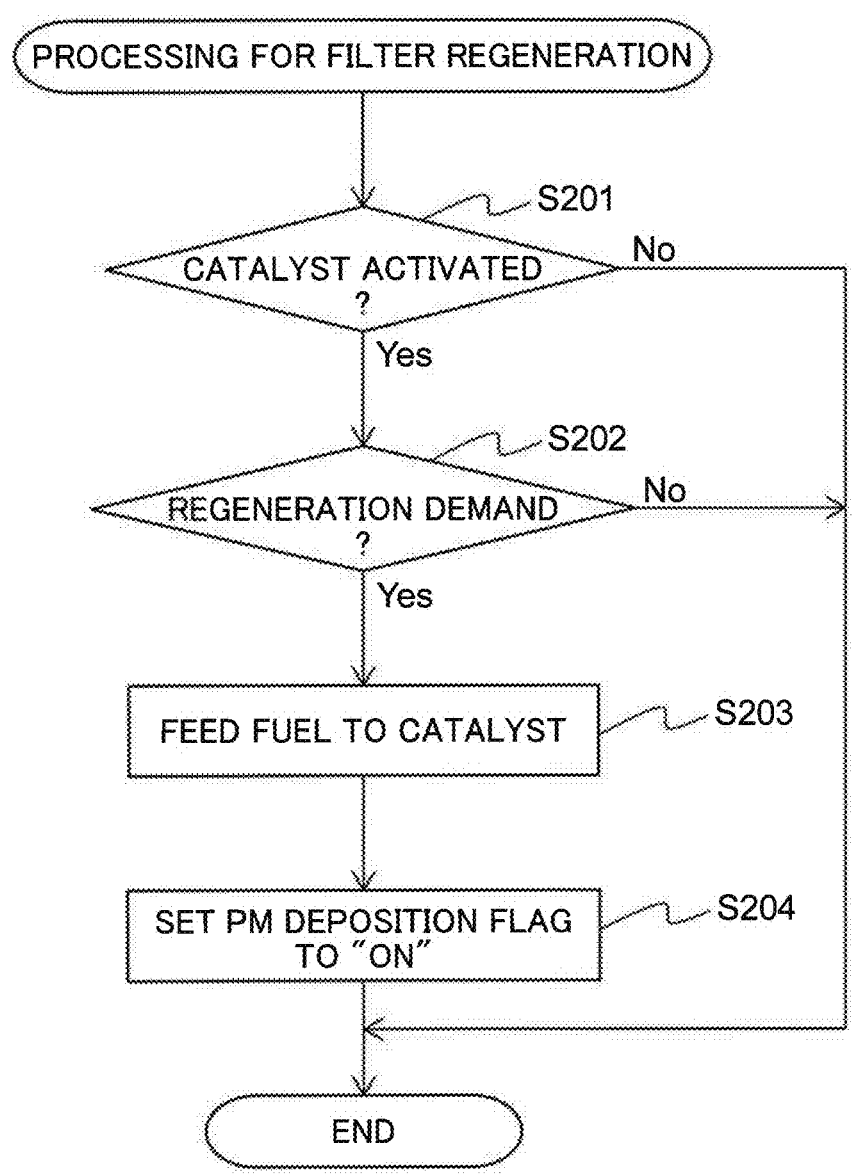
FIG. 7 is a flow chart showing a control routine for processing for filter regeneration in a first embodiment of the present invention.

Below, referring to the flow chart of FIG. 7, the control for the processing for filter regeneration will be explained in detail. FIG. 7 is a flow chart showing a control routine of processing for filter regeneration in the first embodiment of the present invention. The present control routine is repeatedly performed by the control device of the exhaust purification system (in the present embodiment, the ECU 80).

First, at step S201, the control device judges whether the catalyst 28 is in an activated state. The control device, for example, judges that the catalyst 28 is in the activated state if the temperature of the inflowing exhaust gas is the activation temperature of the catalyst 28 or more, and judges that the catalyst 28 is not in the activated state if the temperature of the inflowing exhaust gas is less than the activation temperature of the catalyst 28. The activation temperature of the catalyst 28 is for example 250° C. If at step S201 it is judged that the catalyst 28 is not in the activated state, the present control routine is ended. On the other hand, if it is judged that the catalyst 28 is in the activated state, the present control routine proceeds to step S202.

At step S202, the control device judges whether there is a demand for regeneration of the filter 29. The control device, for example, judges that there is a demand for regeneration of the filter 29 when the estimated value of the amount of the PM deposited on the filter 29 is a predetermined value or more, and judges that there is no demand for regeneration of the filter 29 when the estimated value of the amount of PM is less than the predetermined value. In this case, the control device estimates the amount of PM built up at the filter 29 based on the operating state of the internal combustion engine 1 etc. Further, the control device may judge that there is a demand for regeneration of the filter 29 if the differential pressure between the upstream side of the filter 29 in the direction of exhaust flow and the downstream side in the direction of exhaust flow is a predetermined value or more, and may judge that there is no demand for regeneration of the filter 29 if the differential pressure is less than the predetermined value. In this case, the internal combustion engine 1 is provided with a differential pressure sensor, and the differential pressure sensor is used to detect the differential pressure.

If at step S202 it is judged that there is no demand for regeneration of the filter 29, the present control routine is ended. On the other hand, if it is judged that there is a demand for regeneration of the filter 29, the present control routine proceeds to step S203.

At step S203, the control device feeds fuel from the fuel feed device to the catalyst 28. That is, the control device performs the processing for filter regeneration. The amount of feed of fuel is set in advance so that the temperature of the filter 29 becomes the combustion temperature of the PM or more. The fuel feed time may be changed based on the estimated value of the amount of PM deposited on the filter 29.

Next, at step S204, the PM deposition flag is set to "on". After step S204, the present control routine is ended. Note that, the PM deposition flag may be set to "on" after the processing for filter regeneration is performed a plurality of times. Further, the PM deposition flag may be set to "on" after a predetermined time elapses from when the processing for filter regeneration ended.

Second Embodiment

The exhaust purification system of an internal combustion engine according to a second embodiment is basically similar to the exhaust purification system of an internal combustion engine according to the first embodiment, except for the points explained below. For this reason, below, the second embodiment of the present invention will be explained focusing on the parts different from the first embodiment.

Figure 8:
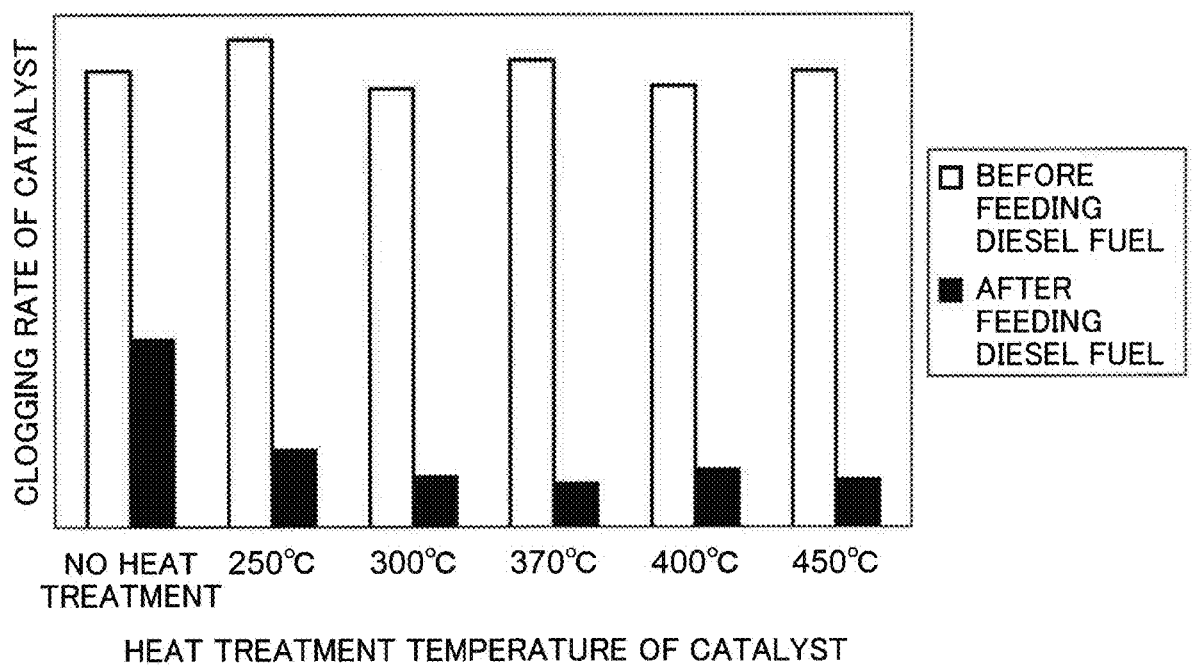
FIG. 8 is a graph showing a relationship between a heat treatment temperature after processing for filter regeneration and a clogging rate of a catalyst.

FIG. 8 is a graph showing a relationship between a heat treatment temperature of a catalyst and a clogging rate of the catalyst. In this experiment, fuel was fed to the catalyst to regenerate the filter, then the catalyst was exposed to 250° C. exhaust gas for 2 hours and the clogging rate of the catalyst was measured. After that, in the initial experiment, without heat treating the catalyst, liquid state diesel fuel in an amount of 0.06 ml/cm$^2$ per unit area of the catalyst was fed to the catalyst, then the clogging rate of the catalyst was measured. In the next five experiments, the catalyst was heat treated for one hour at a temperature of the activation temperature (250° C.) of the catalyst or more, then liquid state diesel fuel in an amount of 0.06 ml/cm$^2$ per unit area of the catalyst was fed to the catalyst and the clogging rate of the catalyst was measured. In the five experiments, the temperature of the heat treatment was changed.

As shown in the graph of FIG. 8, at a catalyst heat treated at a temperature of the activation temperature of the catalyst (250° C.) or more, compared with a catalyst which was not heat treated, the feed of fuel causes the clogging rate of the catalyst to greatly fall. The reason is believed to be as follows: If the catalyst is heat treated, the SOF in the PM deposited on the catalyst is broken down by oxidation and the ratio of the SOF in the PM as a whole falls. For this reason, by feeding diesel fuel after heat treatment of the catalyst, it is possible to reduce the amount of SOF not dissolving into the diesel fuel and remaining in the PM. The smaller the amount of SOF, the lower the adhesive force of the PM, so by feeding diesel fuel after heat treatment of the catalyst, it is possible to promote the detachment of the PM.

Therefore, in the second embodiment, the control device feeds liquid state fuel from the fuel feed device to the catalyst 28 if the total of the time when the temperature of the inflowing exhaust gas detected or estimated after the end of the processing for filter regeneration is a reference temperature or more reaches a threshold value or more. The reference temperature is a temperature of the activation temperature of the catalyst 28 or more, for example, is the activation temperature of the catalyst 28. Due to this control, the catalyst 28 is heat treated by the exhaust gas before the feed of fuel, so removal of the PM on the catalyst 28 by the feed of fuel is promoted. Therefore, it is possible to further suppress the clogging of the catalyst 28 by the PM.

On the other hand, if the temperature of the inflowing exhaust gas is the combustion temperature or more of the PM, the PM deposited on the catalyst 28 is burned off by the exhaust gas. In this case, there is no need to remove PM from the catalyst 28 by the feed of fuel. For this reason, the control device may feed liquid state fuel from the fuel feed device to the catalyst 28 if the total of the time when the temperature of the inflowing exhaust gas detected or estimated after the end of the processing for filter regeneration is a reference temperature to less than the combustion temperature of the PM reaches a threshold value or more.

Note that, the reference temperature may be the temperature of the inflowing exhaust gas detected or estimated during the processing for filter regeneration. By doing this, the SOM in the PM which was not broken down by oxidation during the processing for filter regeneration can be effectively broken down by oxidation by heat treatment after the processing for filter regeneration, and the removal of PM on the catalyst 28 due to the feed of fuel is promoted much more.

\<Processing for Judging PM State\>

Figure 9:
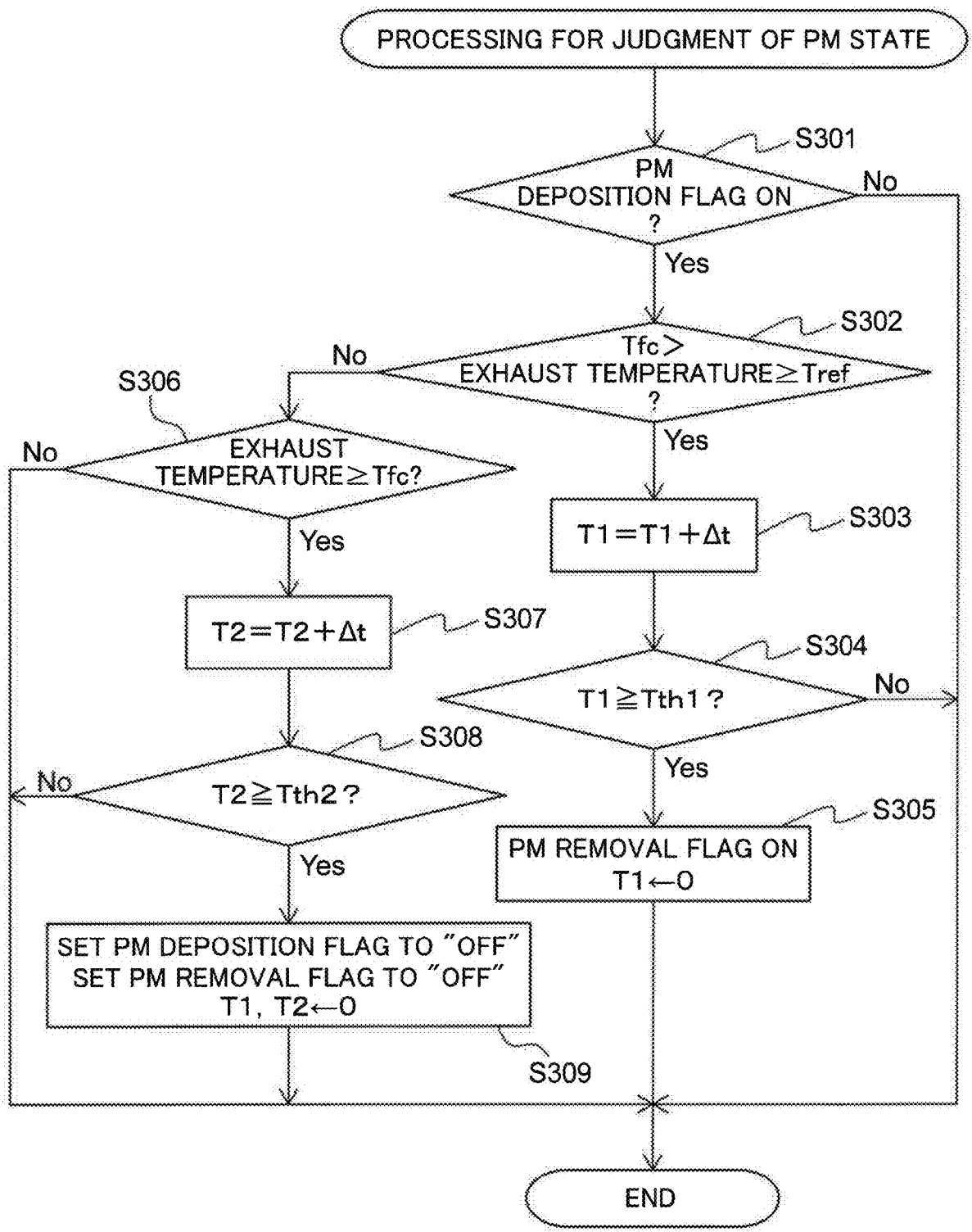
FIG. 9 is a flow chart showing a control routine for processing for judging a PM state in a second embodiment of the present invention.

FIG. 9 is a flow chart showing a control routine of processing for judging a PM state in the second embodiment of the present invention. In the processing for judging the PM state, the existence of any heat treatment of the catalyst 28 and the existence of any combustion of PM on the catalyst 28 is judged. The present control routine is repeatedly executed by the control device of the exhaust purification system (in the present embodiment, the ECU 80).

First, at step S301, the control device judges whether the PM deposition flag is "on". In the same way as the first embodiment, the PM deposition flag is set to "on" in the control routine for processing for filter regeneration shown in FIG. 7. If at step S301 it is judged that the PM deposition flag is "off", the present control routine is ended. On the other hand, if it is judged that the PM deposition flag is "on", the present control routine proceeds to step S302.

At step S302, the control device detects or estimates the temperature of the inflowing exhaust gas (exhaust temperature), and judges whether the temperature of the inflowing exhaust gas is the reference temperature Tref to less than the combustion temperature Tfc of the PM. The reference temperature Tref is the activation temperature of the catalyst 28 and is, for example, 250° C. Further, the reference temperature Tref may be the temperature of the inflowing exhaust gas detected or estimated during the processing for filter regeneration. This temperature is, for example, the average value of the temperature of the inflowing exhaust gas detected or estimated during the processing for filter regeneration. The combustion temperature Tfc of the PM is for example 500° C.

If at step S302 it is judged that the temperature of the inflowing exhaust gas is the reference temperature Tref to less than the combustion temperature Tfc, the present control routine proceeds to step S303. At step S303, the control device updates the first cumulative time T1. The first cumulative time T1 is the total of the time at which the temperature of the inflowing exhaust gas is maintained at the reference temperature Tref to less than the combustion temperature Tfc. Specifically, the control device makes the value of the first cumulative time T1 plus an incremental time Δt the new first cumulative time T1. The incremental time Δt is a value corresponding to the interval of execution of the present control routine.

Next, at step S304, the control device judges whether the first cumulative time T1 is the first threshold value Tth1 or more. The first threshold value Tth1 is a value preset so that the ratio of the SOF to the PM as a whole becomes a predetermined value or less due to heat treatment. The predetermined value is for example 20%, while the first threshold value Tth1 is for example 10 minutes.

If at step S304 it is judged that the first cumulative time T1 is less than the first threshold value Tth1, the present control routine is ended. On the other hand, if it is judged that the first cumulative time T1 is the first threshold value Tth1 or more, the present control routine proceeds to step S305. In this case, it is believed that the catalyst 28 has been sufficiently heat treated. For this reason, at step S305, the control device sets the PM removal flag to "on", and resets the first cumulative time T1 to zero. After step S305, the present control routine is ended.

On the other hand, if at step S302 it is judged that the temperature of the inflowing exhaust gas is not in a range of the reference temperature Tref to less than the combustion temperature Tfc, the present control routine proceeds to step S306. At step S306, the control device judges whether the temperature of the inflowing exhaust gas is the combustion temperature Tfc of the PM or more.

If at step S306 it is judged that the temperature of the inflowing exhaust gas is the combustion temperature Tfc or more, the present control routine proceeds to step S307. At step S307, the control device updates the second cumulative time T2. The second cumulative time T2 is the total of the time when the temperature of the inflowing exhaust gas is maintained at the combustion temperature Tfc or more. Specifically, the control device makes the value of the second cumulative time T2 plus an incremental time Δt the new second cumulative time T2. The incremental time Δt is a value corresponding to the interval of performance of the present control routine.

Next, at step S308, the control device judges whether the second cumulative time T2 is the second threshold value Tth2 or more. The second threshold value Tth2 is a value preset so that burning of the PM causes the amount of PM on the catalyst 28 to become a predetermined value or less. The second threshold value Tth2 is for example 3 minutes.

When at step S308 it is judged that the second cumulative time T2 is less than the second threshold value Tth2, the present control routine is ended. On the other hand, when it is judged that the second cumulative time T2 is the second threshold value Tth2 or more, the present control routine proceeds to step S309. In this case, the amount of the PM on the catalyst 28 is believed to be a predetermined value or less. For this reason, at step S309, the control device sets the PM deposition flag and PM removal flag to "off", and resets the first cumulative time T1 and second cumulative time T2 to zero. After step S309, the present control routine is ended.

Note that, step S306 to step S309 may be omitted. In this case, at step S302, the control device detects or estimates the temperature of the inflowing exhaust gas, and judges whether the temperature of the inflowing exhaust gas is the reference temperature Tref or more. If it is judged that the temperature of the inflowing exhaust gas is less than the reference temperature Tref, the present control routine is ended.

\<Processing for PM Removal\>

Figure 10:
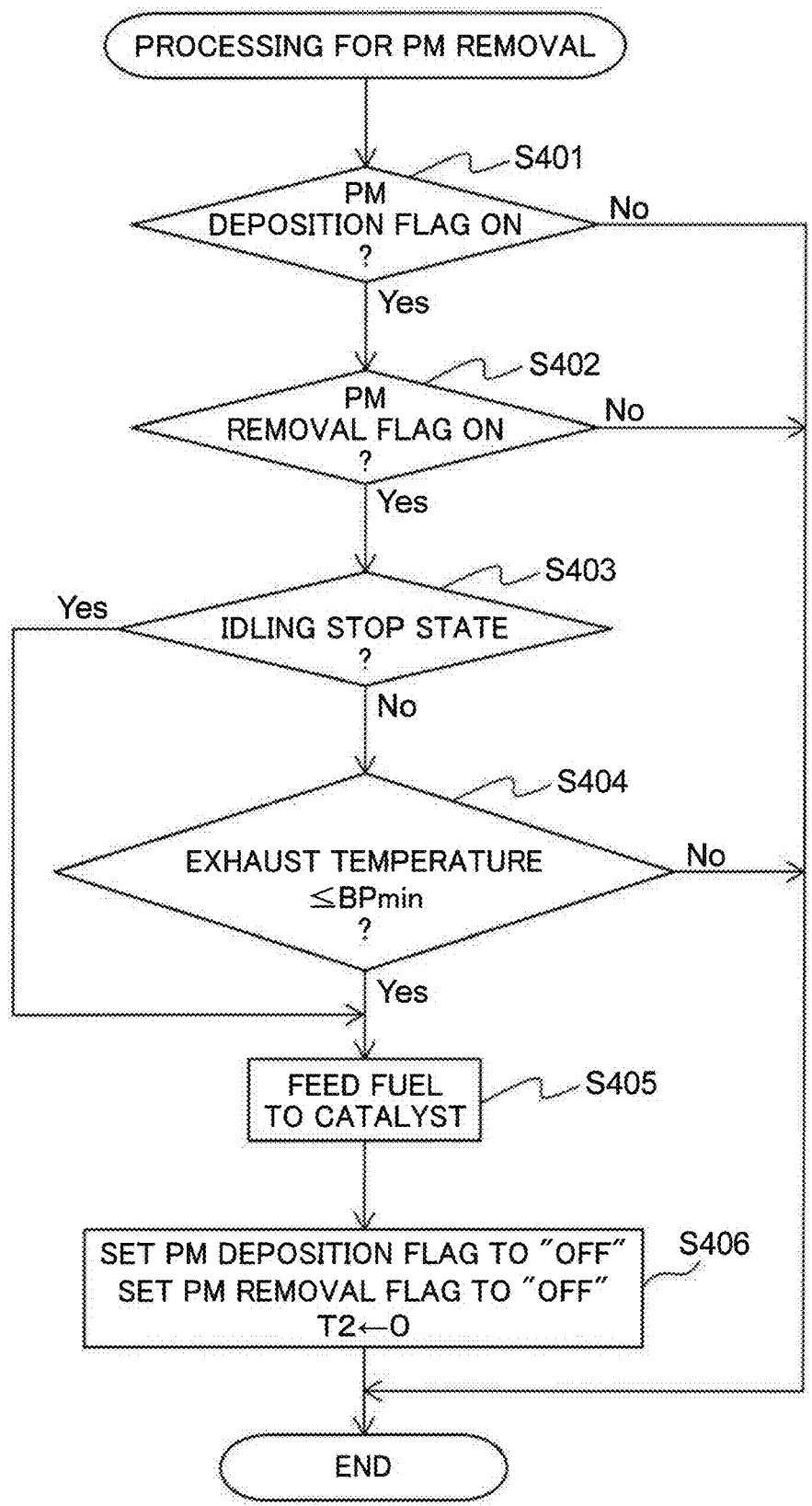
FIG. 10 is a flow chart showing a control routine for processing for PM removal in a second embodiment of the present invention.

FIG. 10 is a flow chart showing the control routine for processing for PM removal in the second embodiment of the present invention. The present control routine is repeatedly performed by the control device of the exhaust purification system (in the present embodiment, the ECU 80).

First, at step S401, the control device, in the same way as step S101 of FIG. 6, judges whether the PM deposition flag is "on". If it is judged that the PM deposition flag is "off", the present control routine is ended. On the other hand, if it is judged that the PM deposition flag in "on", the present control routine proceeds to step S402.

At step S402, the control device judges whether the PM removal flag is "on". The PM removal flag is set to "on" in the control routine of the processing for judging PM state explained above. If at step S402 it is judged that the PM removal flag is off, the present control routine is ended. On the other hand, when it is judged that the PM deposition flag is on, the present control routine proceeds to step S403. Step S403 to step S405 are similar to step S102 to step S104 at FIG. 6.

After step S405, at step S406, the control device sets the PM deposition flag and PM removal flag to "off", and resets the second cumulative time T2 to zero. After step S406, the present control routine is ended.

Above, preferred embodiments of the present invention were explained, but the present invention is not limited to these embodiments and can be corrected and changed in various ways within the language of the claims. For example, the catalyst may be supported on the filter. Specifically, the catalyst may be coated on the surface of the filter and be integral with the filter. Further, the catalyst may also an NOx storage and reduction catalyst (NSR catalyst). In this case as well, to regenerate the filter, an oxidation reaction of the fuel is performed at the NOx storage and reduction catalyst, and the PM deposits on the NOx storage and reduction catalyst through the fuel remaining on the upstream side end face of the NOx storage and reduction catalyst. Further, the fuel fed from the fuel feed device may be fuel other than diesel fuel such as biodiesel fuel.

REFERENCE SIGN LIST 1. internal combustion engine
3. cylinder fuel injector
27. exhaust pipe
28. catalyst
29. filter
35. exhaust fuel injector
80. electronic control unit (ECU)

The invention claimed is:

1. An exhaust purification system of an internal combustion engine comprising:
    a filter arranged in an exhaust passage of the internal combustion engine and trapping particulate matter contained in exhaust gas,
    a catalyst arranged in the exhaust passage at an upstream side from the filter in a direction of exhaust flow or supported on the filter,
    an injector configured to feed fuel to the catalyst, and
    an electronic control unit configured to control the feed of fuel by the injector, wherein
    the electronic control unit is configured to perform filter regeneration by feeding fuel from the injector to the catalyst so as to burn off particulate matter trapped at the filter, and feed fuel from the injector so that the fuel arrives at the catalyst in a liquid state after the filter regeneration, and
    the injector is arranged in the exhaust passage at an upstream side from the catalyst in a direction of exhaust flow, and the electronic control unit is configured to feed fuel from the injector to the catalyst when the internal combustion engine is in an idling stop state after the filter regeneration.

2. The exhaust purification system of the internal combustion engine according to claim 1, wherein the electronic control unit is configured to detect or estimate a temperature of an inflowing exhaust gas flowing into the catalyst, and feed fuel from the injector to the catalyst when the detected or estimated temperature of the inflowing exhaust gas is a minimum boiling point of the fuel or less after the filter regeneration.

3. The exhaust purification system of the internal combustion engine according to claim 2, wherein the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature or more reaches a threshold value or more, the reference temperature being a temperature of an activation temperature of the catalyst or more.

4. The exhaust purification system of the internal combustion engine according to claim 2, wherein the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature to less than a combustion temperature of the particulate matter reaches a threshold value or more, the reference temperature being a temperature of an activation temperature of the catalyst or more.

5. The exhaust purification system of the internal combustion engine according to claim 1, wherein the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature or more reaches a threshold value or more, the reference temperature being a temperature of an activation temperature of the catalyst or more.

6. The exhaust purification system of the internal combustion engine according to claim 5, wherein the reference temperature is the activation temperature of the catalyst.

7. The exhaust purification system of the internal combustion engine according to claim 5, wherein the reference temperature is a temperature of the inflowing exhaust gas detected or estimated during the filter regeneration.

8. The exhaust purification system of the internal combustion engine according to claim 1, wherein the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature to less than a combustion temperature of the particulate matter reaches a threshold value or more, the reference temperature being a temperature of an activation temperature of the catalyst or more.

9. The exhaust purification system of the internal combustion engine according to claim 8, wherein the reference temperature is the activation temperature of the catalyst.

10. The exhaust purification system of the internal combustion engine according to claim 8, wherein the reference temperature is a temperature of the inflowing exhaust gas detected or estimated during the filter regeneration.

11. An exhaust purification system of an internal combustion engine comprising:
    a filter arranged in an exhaust passage of the internal combustion engine and trapping particulate matter contained in exhaust gas,
    a catalyst arranged in the exhaust passage at an upstream side from the filter in a direction of exhaust flow or supported on the filter,
    an injector configured to feed fuel to the catalyst, and
    an electronic control unit configured to control the feed of fuel by the injector, wherein
    the electronic control unit is configured to perform filter regeneration by feeding fuel from the injector to the catalyst so as to burn off particulate matter trapped at the filter, and feed fuel from the injector so that the fuel arrives at the catalyst in a liquid state after the filter regeneration, and
    the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature or more reaches a threshold value or more, the reference temperature being a temperature of an activation temperature of the catalyst or more.

12. An exhaust purification system of an internal combustion engine comprising:
- a filter arranged in an exhaust passage of the internal combustion engine and trapping particulate matter contained in exhaust gas,
- a catalyst arranged in the exhaust passage at an upstream side from the filter in a direction of exhaust flow or supported on the filter,
- an injector configured to feed fuel to the catalyst, and
- an electronic control unit configured to control the feed of fuel by the injector, wherein
- the electronic control unit is configured to perform filter regeneration by feeding fuel from the injector to the catalyst so as to burn off particulate matter trapped at the filter, and feed fuel from the injector so that the fuel arrives at the catalyst in a liquid state after the filter regeneration, and
- the electronic control unit is configured to detect or estimate a temperature of an inflowing exhaust gas flowing into the catalyst, and feed liquid state fuel from the injector to the catalyst if a total of the time when the temperature of the inflowing exhaust gas detected or estimated after an end of the filter regeneration is a reference temperature to less than a combustion temperature of the particulate matter reaches a threshold value or more, the reference temperature being a temperature of an activation temperature of the catalyst or more.

* * * * *